United States Patent
Knopik et al.

(10) Patent No.: US 10,686,475 B2
(45) Date of Patent: Jun. 16, 2020

(54) METHOD OF CONTROLLING THE ADAPTATION OF AN ANTENNA TO A TRANSMISSION PATH, AND CORRESPONDING DEVICE

(71) Applicants: STMicroelectronics SA, Montrouge (FR); CENTRE NATIONAL DE LA RECHERCHE SCIENTIFIQUE, Paris (FR); INSTITUT POLYTECHNIQUE DE BORDEAUX, Talence (FR); UNIVERSITE DE BORDEAUX, Bordeaux (FR)

(72) Inventors: Vincent Knopik, Crets en Belledonne (FR); Boris Moret, Artigues-Pres-Bordeaux (FR); Eric Kerherve, Pessac (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/610,834

(22) PCT Filed: May 5, 2017

(86) PCT No.: PCT/FR2017/051088
§ 371 (c)(1),
(2) Date: Nov. 4, 2019

(87) PCT Pub. No.: WO2018/202958
PCT Pub. Date: Nov. 8, 2018

(65) Prior Publication Data
US 2020/0076458 A1    Mar. 5, 2020

(51) Int. Cl.
*H04B 1/04* (2006.01)
*G01K 13/00* (2006.01)

(52) U.S. Cl.
CPC .......... *H04B 1/0458* (2013.01); *G01K 13/00* (2013.01); *H04B 1/0483* (2013.01)

(58) Field of Classification Search
CPC ..... H04B 1/0458; H04B 1/0483; G01K 13/00
(Continued)

(56) References Cited

U.S. PATENT DOCUMENTS 7,221,327 B2 * 5/2007 Toncich ............ G01R 27/2694
                                                              333/17.3
9,628,135 B1 * 4/2017 Broyde ..................... H04B 1/18
(Continued)

FOREIGN PATENT DOCUMENTS

| CN | 102110238 A | 6/2011 |
| FR | 3010263 A1 | 3/2015 |
| WO | 2016111897 A1 | 7/2016 |

*Primary Examiner* — Sonny Trinh
(74) *Attorney, Agent, or Firm* — Slater Matsil, LLP (57) ABSTRACT

A method is provided for controlling the matching of an antenna to a transmission path. The transmission path includes an amplifier stage coupled at an input or at an output to the antenna and to a resistive load. The method includes performing a checking phase by measuring a first current temperature at or in proximity of the antenna and a second current temperature at or in proximity of the resistive load, triggering a matching of the impedance seen at the input or at the output of the amplifier stage in the presence of a first condition involving the first and second current temperatures, and then stopping the matching of the impedance in the presence of a second condition involving the second current temperature.

22 Claims, 3 Drawing Sheets

(58) Field of Classification Search
USPC .................................................. 455/121, 129
See application file for complete search history.

(56) References Cited

U.S. PATENT DOCUMENTS

| | | | |
|---|---|---|---|
| 9,729,111 B2* | 8/2017 | Gonzalez Jimenez .. | H03H 7/40 |
| 9,966,924 B2* | 5/2018 | Broyde ................... | H03H 7/40 |
| 2009/0066440 A1* | 3/2009 | Chan Wai Po .......... | H03F 1/56 |
| | | | 333/32 |
| 2013/0069737 A1* | 3/2013 | See ......................... | H04B 1/18 |
| | | | 333/32 |
| 2016/0204820 A1* | 7/2016 | Mow ....................... | H04B 1/40 |
| | | | 455/575.7 |
| 2016/0211813 A1 | 7/2016 | Gonzalez Jimenez | |
| 2017/0302326 A1* | 10/2017 | Mow ....................... | H04B 1/40 |

\* cited by examiner

METHOD OF CONTROLLING THE ADAPTATION OF AN ANTENNA TO A TRANSMISSION PATH, AND CORRESPONDING DEVICE

CROSS-REFERENCE TO RELATED APPLICATIONS

This patent application is a national phase filing under section 371 of PCT/FR2017/051088, filed May 5, 2017, which is hereby incorporated herein by reference.

TECHNICAL FIELD

Implementations and embodiments of the invention relate to a method of controlling the adaptation of an antenna to a transmission path, and a corresponding device.

BACKGROUND

Generally, the front-end circuit of such an RF electronic device comprises at least one amplifier coupled at the output or at the input to an antenna to respectively transmit or receive an RF signal.

In transmission, the amplifier or amplifiers coupled at the output to the antenna are typically power amplifiers.

In reception, the amplifier or amplifiers coupled at the input to the antenna are typically low-noise amplifiers (LNAs).

If, for example, the transmission side is considered, each power amplifier of the RF electronic device receives, at its input, an input signal with a low amplitude and then delivers, in an ideal case, at its output to the antenna, an output signal which is an amplified image of the input signal.

In order to allow a maximal transfer of power between the transmission path and the antenna, it is desirable to ensure a matching of the antenna to the amplifier in terms of their respective impedances. In other words, it is desirable for the impedance of the antenna to be equal to the optimal impedance to be exhibited at the output of the amplifier to avoid reflections.

In this respect, a standing wave ratio (SWR), or more specifically "VSWR" (voltage standing wave ratio), is generally used to assess the quality of the matching of the antenna to the amplifier.

When the impedances of the antenna and of the amplifier are matched, all the power of the output signal is delivered to the antenna. There is therefore no wave reflection and the voltage standing wave ratio VSWR is 1, i.e. the minimal value.

When the ratio VSWR becomes greater than 1, the impedances of the antenna and of the amplifier are no longer matched. Consequently, there is a wave reflected from the antenna to the amplifier.

This impedance mismatch consequently causes a reduction on the electrical power delivered to the antenna and a degradation of the performance levels of the power amplifier. Furthermore, this reflected wave will be able to negatively influence the reliability of the amplifier.

Conventional circuits for detecting wave reflection and voltage standing wave ratio VSWR levels between an antenna and a power amplifier require a direct implementation between the antenna and the amplifier together with correction circuits for modifying the impedance of the antenna so as to match any change of the impedance of the antenna. This implementation inevitably presents insertion losses at the output of the amplifier, which reduces the performance of the power amplifier.

The drawbacks which have just been described for an amplifier of a transmission chain can be transposed to an amplifier of a reception chain.

There is thus a need to propose a technical solution of low complexity that makes it possible to detect the level of impedance matching between the amplifier and the antenna, whether in transmission and/or in reception, in particular via the VSWR ratio, without introducing therein insertion losses and to rematch the impedance of the output of the amplifier to that of the antenna when there has been a variation of impedance on the latter.

SUMMARY

Implementations and embodiments of the invention relate to the electronic devices that are dedicated to information transmissions, such as for radiofrequency (RF) applications will. Particular embodiments relate to the "front-end" circuits of these RF electronic devices, for example, those dedicated to the matching of an antenna to a transmission path.

According to one aspect, a method is proposed for checking the matching of an antenna to a transmission path. The transmission path comprises an amplifier stage coupled at the input or at the output to the antenna and to a resistive load. The method comprises a checking phase comprising a measurement of a first current temperature at or in proximity to the antenna and of a second current temperature at or in proximity to the resistive load, a triggering of a matching of the impedance seen at the input or at the output of the amplifier stage in the presence of a first condition involving at least the first and second temperatures, and then a stopping of the matching of the impedance in the presence of a second condition involving at least the second temperature.

It should be noted that such a totally symmetrical method can be applied to a transmission path to transmit an RF signal to an antenna and to a transmission path to receive an RF signal via an antenna. The output of the amplifier stage is coupled to the antenna in transmission whereas the input of the amplifier stage is coupled to the antenna in reception.

In one example, when the impedances of the input or of the output of the amplifier stage and of the antenna are matched, the VSWR ratio is 1 and there are therefore no wave reflections.

The resistive load can be configured to receive all the wave reflections if there are any. Without wave reflection, the first current temperature at the antenna is consequently higher than the second current temperature at the resistive load.

In the case where the first condition is fulfilled, there is a variation on the impedance of the antenna and the mismatching of the impedance of the antenna leads to the VSWR ratio higher than 1. There is wave reflection to the resistive load, which leads to an increase in the second temperature.

In other words, the impedance mismatch between the amplifier stage and the antenna can be detected by measuring variations of the first and second temperatures.

When the second condition is fulfilled, the second temperature reverts to its initial value. It can thus be concluded that the impedance matching between the amplifier stage and the antenna is re-established.

As will be seen in more detail hereinbelow, such a method advantageously does not require any direct (invasive) circuit implementation between the amplifier stage and the antenna.

Because of this, the insertion losses introduced between the amplifier stage and the antenna to detect and check the matching of the antenna to the amplifier stage are advantageously minimal, or even zero.

The method can for example also comprise a calibration phase prior to the checking phase and comprises a replacement in the transmission path of the antenna by a reference impedance and a setting of the amplifier stage in an operating state, a definition of path reference temperatures contained within a range of path reference temperatures, and, for each path reference temperature, a measurement of a first reference temperature at the reference impedance and a measurement of a second reference temperature at the resistive load.

It should be noted that the reference impedance is advantageously matched to the impedance of the amplifier stage for it to be possible to measure the first and second reference temperatures for each path reference temperature when there is no wave reflection.

According to one implementation, the checking phase comprises a measurement of a current path temperature of the transmission path, a first comparison between the second current temperature and the second reference temperature associated with a path reference temperature corresponding to the current path temperature, and a second comparison between the first current temperature and the first reference temperature associated with a path reference temperature corresponding to the current path temperature.

The first condition can be fulfilled if the first current temperature is lower than or equal to the first reference temperature augmented by a first threshold, and if the second current temperature is higher than the second reference temperature augmented by a second threshold.

According to another implementation, the checking phase comprises a first measurement of a first current path temperature of the transmission path, a first comparison between the second current temperature and the second reference temperature associated with a path reference temperature corresponding to the first current path temperature, a second comparison between the first current temperature and the first reference temperature associated with a path reference temperature corresponding to the first current path temperature, a second measurement, on completion of the second comparison, of a second current path temperature of the transmission path, and a third comparison between the first and second current path temperatures.

The first condition can be fulfilled if the first current temperature is higher than the first reference temperature augmented by a first threshold, and if the second current temperature is higher than the second reference temperature augmented by a second threshold, and if the second current path temperature is lower than or equal to the first current path temperature.

According to yet another implementation, the checking phase comprises a first measurement of a first current path temperature of the transmission path, a first comparison between the second current temperature and the second reference temperature associated with a path reference temperature corresponding to the first current path temperature, a second comparison between the first current temperature and the first reference temperature associated with a path reference temperature corresponding to the first current path temperature, a second measurement, on completion of the second comparison, of a second current path temperature of the transmission path, a third comparison between the first and second current path temperatures, and a fourth comparison, on completion of the third comparison, between a current difference between the first and second current temperatures and a reference difference between the first reference temperature augmented by a first threshold and the second reference temperature augmented by a second threshold.

The first condition can be fulfilled if the first current temperature is higher than the first reference temperature augmented by a first threshold, and if the second current temperature is higher than the second reference temperature augmented by a second threshold, and if the second current path temperature is higher than the first current path temperature, and if the current difference is lower than or equal to the reference difference.

As an example, the second condition can be fulfilled if the second current temperature is higher than the second reference temperature augmented by the second threshold, and if the first current temperature is higher than the first reference temperature augmented by the first threshold, and if the second current path temperature is higher than the first current path temperature, and if the current difference is higher than the reference difference.

The second condition can also be fulfilled if the second current temperature is lower than or equal to the second reference temperature augmented by the second threshold.

In one example, the first and second thresholds are equal.

According to another aspect, an electronic device is proposed. The device comprises an antenna, and a transmission path.

The transmission path comprises an amplifier stage coupled at the input or at the output to the antenna and to a resistive load, a first temperature sensor positioned in proximity to the antenna and configured to measure a first current temperature, a second temperature sensor positioned in proximity to the resistive load and configured to measure a second current temperature.

The device also comprises a processor configured to trigger a matching of the impedance seen at the input or at the output of the amplifier stage in the presence of a first condition involving at least the first and second current temperatures then to stop the matching of the impedance in the presence of a second condition involving at least the second current temperature.

The fact that the first and second sensors are positioned respectively in proximity to the antenna and to the resistive load but not directly between the amplifier stage and the antenna advantageously makes it possible to avoid insertion losses so as to improve the performance of the electronic device.

The device can, for example, also comprises a memory configured to store path reference temperatures contained within a range of path reference temperatures and, for each path reference temperature, a first reference temperature measured at a reference impedance in the place of the antenna and a second reference temperature measured at the resistive load, with an amplifier stage in operating state.

According to one embodiment, the device also comprises a third temperature sensor configured to perform a first measurement of a first current path temperature of the transmission path.

The processor can comprise a comparator configured to perform a first comparison between the second current temperature and the second reference temperature associated with a path reference temperature corresponding to the first current path temperature, and a second comparison between the first current temperature and the first reference temperature associated with the path reference temperature.

The first condition can be fulfilled if the first current temperature is lower than or equal to the first reference temperature augmented by a first threshold, and if the second current temperature is higher than the second reference temperature augmented by a second threshold.

According to another embodiment, the device also comprises a third temperature sensor capable of measuring a current path temperature of the transmission path and configured to perform a first measurement of a first current path temperature of the transmission path.

The processor can comprise a comparator configured to perform a first comparison between the second current temperature and the second reference temperature associated with a path reference temperature corresponding to the first current path temperature, and a second comparison between the first current temperature and the first reference temperature associated with the path reference temperature.

The third sensor can also be configured to perform a second measurement, on completion of the second comparison, of a second current path temperature of the transmission path.

The processor can also be configured to perform a third comparison between the first and second current path temperatures.

The first condition can be fulfilled if the first current temperature is higher than the first reference temperature augmented by a first threshold, and if the second current temperature is higher than the second reference temperature augmented by a second threshold, and if the second current line temperature is lower than or equal to the first current path temperature.

According to yet another embodiment, the device also comprises a third temperature sensor capable of measuring a current path temperature of the transmission path and configured to perform a first measurement of a first current path temperature of the transmission path.

The processor can comprise a comparator configured to perform a first comparison between the second current temperature and the second reference temperature associated with a path reference temperature corresponding to the first current path temperature, and a second comparison between the first current temperature and the first reference temperature associated with the path reference temperature.

The third sensor can also be configured to perform a second measurement, on completion of the second comparison, of a second current path temperature of the transmission path.

The comparator can also be configured to perform a third comparison between the first and second current path temperatures, and a fourth comparison, on completion of the third comparison, between a current difference between the first and second current temperatures and a reference difference between the first reference temperature augmented by a first threshold and the second reference temperature augmented by a second threshold.

The first condition can be fulfilled if the first current temperature is higher than the first reference temperature augmented by the first threshold, and if the second current temperature is higher than the second reference temperature augmented by the second threshold, and if the second current path temperature is higher than the first current path temperature, and if the current difference is lower than or equal to the reference difference.

As an indication, the second condition can be fulfilled if the first current temperature is higher than the first reference temperature augmented by the first threshold, and if the second current temperature is higher than the second reference temperature augmented by the second threshold, and if the second current path temperature is higher than the first current path temperature, and if the current difference is higher than the reference difference.

The second condition can also be fulfilled if the second current temperature is lower than or equal to the second reference temperature augmented by the second threshold.

The first and second thresholds can for example be identical.

The device can also comprises a first coupling stage comprising a 90° power splitter, and a second coupling stage comprising a 90° power combiner of which the first and second input or output terminals are respectively coupled to the antenna and to the resistive load.

The amplifier stage can comprise two balanced power amplifiers coupled in parallel between the first and second coupling stages.

Such a 90° power combiner makes it possible to direct all the wave reflections to the resistive load so as to advantageously protect the two balanced power amplifiers against the wave reflections.

According to an embodiment, the processor can comprise a controller coupled between the output of the comparator and the input or the output of the amplifier stage and the inputs and the outputs of the second coupling stage, and configured to check the impedance seen at the input or at the output of the amplifier stage as a function of the result of the first, second, third and fourth comparisons.

The distance between the first and second input or output terminals of the second coupling stage can be greater than 100 μm.

The device can, for example, be produced in an integrated manner.

According to yet another aspect, a wireless communication unit is proposed incorporating at least one device as defined above.

BRIEF DESCRIPTION OF THE DRAWINGS

Other advantages and features of the invention will become apparent on studying the detailed description of implementations and embodiments, which are in no way limiting, and the attached drawings in which.

DETAILED DESCRIPTION OF ILLUSTRATIVE EMBODIMENTS

Figure 1:
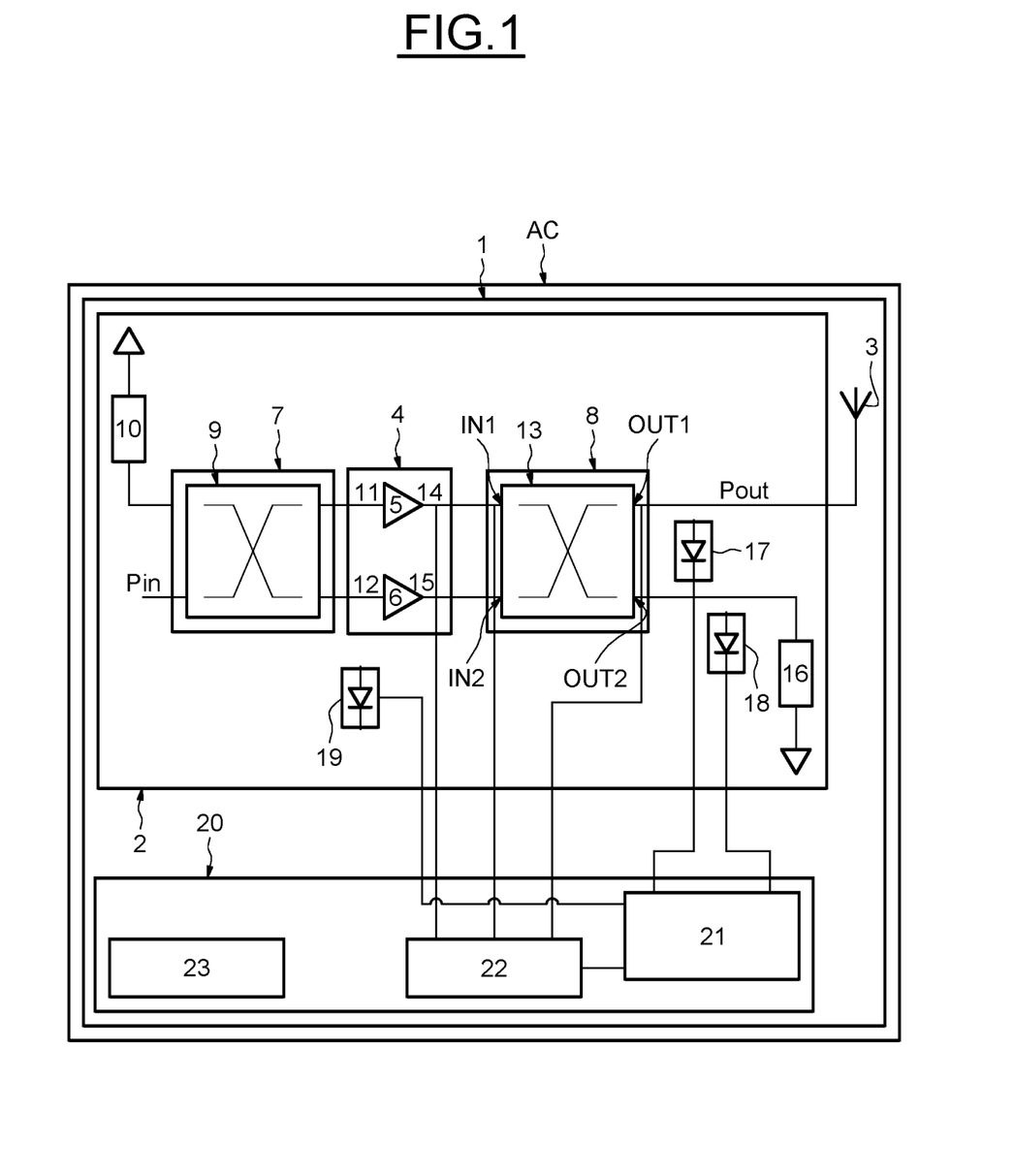
FIGS. 1 to 4 schematically illustrate implementations and embodiments of the invention.

The reference AC illustrated in FIG. 1 represents a wireless communication unit, here, for example, a portable cellular telephone comprising at least one electronic device 1, here for example, a millimetric radiofrequency device 1 produced in an integrated manner.

The device 1 can comprise one or more transmission paths 2 each coupled to an antenna 3. For the purposes of simplification, FIG. 1 here illustrates an example of a single transmission path 2 coupled to the antenna 3. This transmission path 2 can be configured to transmit an RF signal or receive an RF signal via the antenna 3. For the purposes of simplification and clarity, only the case of a transmission path for RF signal transmission is considered hereinbelow.

The transmission path 2 comprises an amplifier stage 4 comprising a first and a second identical balanced amplifier 5 and 6 coupled in parallel between a first coupling stage 7 and a second coupling stage 8.

The first coupling stage 7 comprises a first hybrid quadrature coupler, here for example a 90° power splitter referenced 9 of which a first input is coupled to a resistor 10, of which a second input is intended to receive an input of power signal of Pin, of which a first output is coupled to the input 11 of the first amplifier 5, and of which a second output is coupled to the input 12 of the second amplifier 6.

In an ideal case, the power of the input signal Pin is distributed equally via the power splitter 9, between the first and second outputs of the power splitter 9, with a phase shift of 90° between these first and second outputs. No power is transmitted to the resistor 10.

The second coupling stage 8 comprises a second hybrid quadrature coupler, here for example a 90° power combiner referenced 13 of which a first input terminal IN1 is coupled to the output 14 of the first amplifier 5, of which a second input terminal IN2 is coupled to the output 15 of the second amplifier 6, of which a first output terminal OUT1 is coupled to the antenna 3 and of which a second output terminal OUT2 is coupled to a resistive load 16.

Since the first and second amplifiers 5 and 6 are identical, there are thus obtained at the outputs 14 and 15 of the first and second amplifiers 5 and 6, the amplified signals Pin/2, with a phase shift of 90° between these outputs.

In an ideal case, the transmitted power Pout at the antenna 3 is equal to the combination of the powers of the output signals of the amplifiers 5 and 6, with no phase shift relative to the input signal Pin. By analogy, no power is transmitted to the resistive load 16.

The transmission path 2 also comprises a first temperature sensor 17 positioned in or in proximity to the antenna 3, a second temperature sensor 18 positioned at or in proximity to the resistive load 16, and a third temperature sensor 19 positioned in or in proximity to the transmission path 2, here for example alongside the amplifier stage 4. The first, second and third temperature sensors 17 to 19 each comprise for example, conventionally and as is known per se, a transistor mounting mounted as diode, a diode or any other device allowing a temperature detection and measurement.

In order to avoid mutual influences between the first and second temperature sensors 17 and 18, it is preferable to keep a distance between the first and second outputs of the second coupling stage 8, at least equal to 100 μm, preferably of the order of 200 μm.

The device 1 also comprises a processor 20 coupled to the first, second and third temperature sensors 17 to 19, and configured to trigger a matching of the impedance seen at the output of the amplifier stage 4 in the presence of a first condition C1 involving at least the first and second temperatures measured respectively by the first and second sensors 17 and 18, then to stop the matching of the impedance in the presence of a second condition C2 involving at least the second temperature.

The processor 20 comprises a comparator 21 coupled respectively to the first, second and third temperature sensors 17 to 19. The processor 20 also comprises a controller 22 coupled to the comparator 21, to the outputs 14 and 15 of the first and second amplifiers 5 and 6, and to the power combiner 13.

As was explained above, when the impedance of the antenna 3 and the impedance seen at the output of the amplifier stage 4 are matched, no power is transmitted at the resistive load 16. In other words, the temperature at the resistive load 16 is normally less high than that at the antenna 3.

Figure 2:
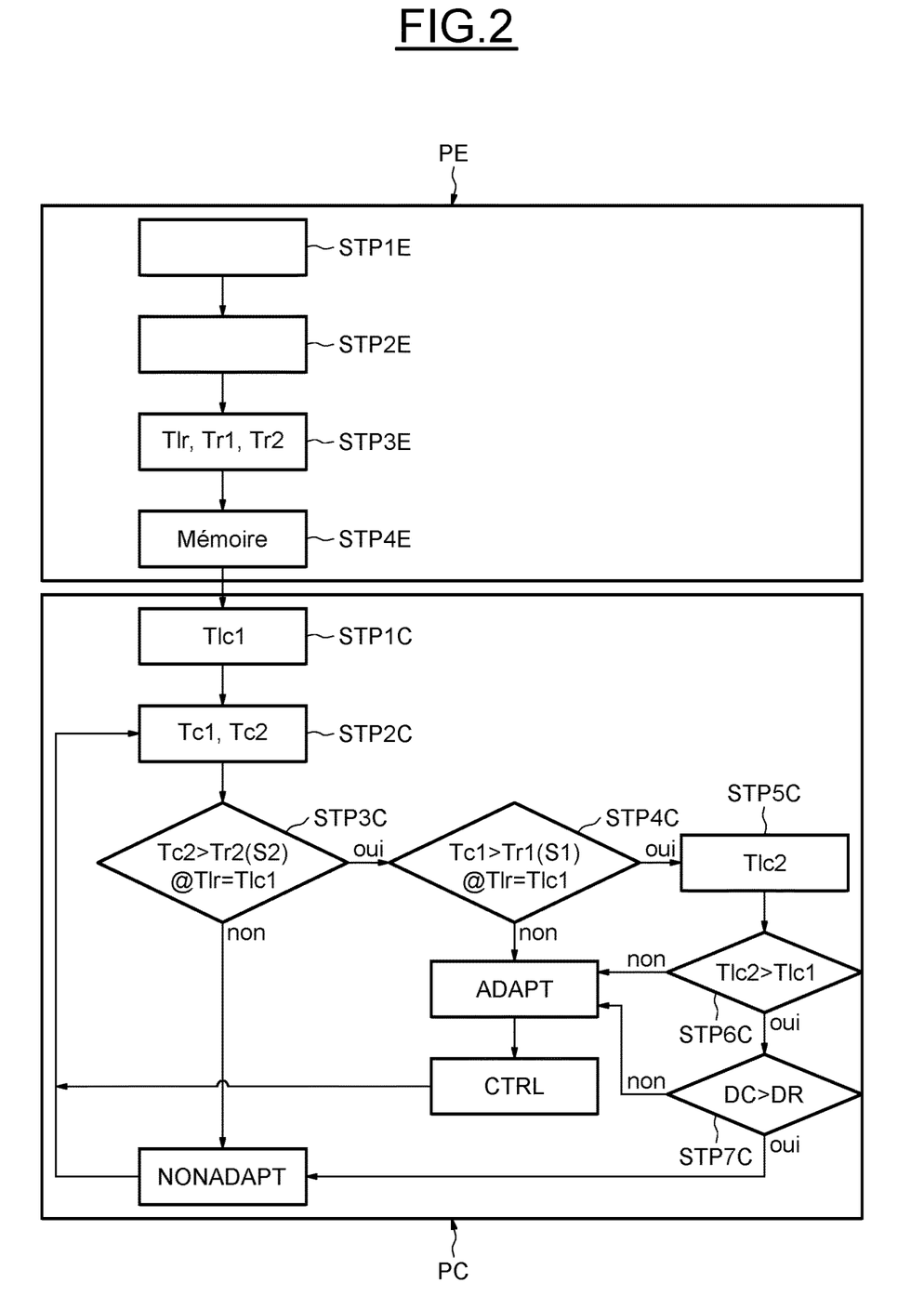

Reference is now made to FIG. 2 to illustrate an example of the method for checking the matching of the antenna 3 to the transmission path 2 according to one implementation.

In order to calibrate reference temperatures by taking into account the temperature of the transmission path 2, a calibration phase PE should be provided prior to a phase of checking PC the matching of the antenna 3 to the transmission path 2.

In the calibration phase PE, the transmission path 2 is coupled, in the place of the antenna 3, to a reference impedance (not illustrated) matched to the impedance seen at the output of the amplifier stage 4 (STP1E).

The device 1 is then set, in a following step (STP2E), in an operating state.

A series is defined of path reference temperatures Tlr contained within a range of path reference temperatures, for example every two degrees between −40° and 80°.

For each path reference temperature Tlr as defined above, the sensors 17 and 18 are configured to perform a measurement of a first reference temperature Tr1 at or in proximity to the reference impedance and a measurement of a second reference temperature Tr2 at or in proximity to the resistive load 16 (STP3E).

The processor 20 also comprises a memory 23 (FIG. 1) configured to store each path reference temperature Tlr and the first and second corresponding reference temperatures Tr1 and Tr2 (STP4E).

It should be noted that, in the calibration phase PE, the second reference temperature Tr2 is always less high than the first reference temperature Tr1.

In the checking phase PC, the transmission path 2 is coupled to the antenna 3 and the processor 20 is configured to detect a variation of the impedance of the antenna 3 (NONADAPT) if the first condition is fulfilled or simply a matching of the antenna 3 (ADAPT) to the transmission path 2 when the second condition is fulfilled.

When the first condition is fulfilled, the controller 22 is configured to modify, in a checking step CTRL, the impedance seen at the output of the amplifier stage 4 so as to re-match the impedance of the antenna 3.

And the impedance matching will be performed as long as the second condition is not fulfilled.

When the second condition is fulfilled, the impedance matching is stopped. Obviously, if the second condition is fulfilled before the first, the impedance matching is not triggered as long as the first condition is not fulfilled.

For this, the third sensor 19 is configured to measure, in a first step STP1C, a first current path temperature Tlc1 while the first and second sensors 17 and 18 are configured to respectively measure, in a second step STP2C, a first current temperature Tc1 and a second current temperature Tc2.

The stored path reference temperature Tlr which is equal to or close to the first current path temperature Tlc1 is then determined, and the first and second corresponding stored reference temperatures Tr1 and Tr2 can be deduced therefrom.

Then, the comparator 21 is configured to perform a first comparison (STP3C) between the second current temperature Tc2 and the second reference temperature Tr2 augmented by a second threshold S2.

This second threshold S2 is configured here to adjust the sensitivity of the control method. The value of the second threshold S2 is a relative value and can for example be 10% to 30% of the second reference temperature Tr2.

When the second current temperature Tc2 is lower than or equal to the second reference temperature Tr2 augmented by the second threshold S2, the second condition is fulfilled and there is a return to the second step STP2C.

Otherwise, the comparator 21 is configured to perform a second comparison (STP4C) between the first current temperature Tc1 and the first reference temperature Tr1 augmented by a first threshold S1.

The first and second thresholds S1 and S2 can be identical or different. As an example, it is possible to have the first threshold S1 equal to the second threshold S2.

The first condition is fulfilled if the first current temperature Tc1 is lower than or equal to the first reference temperature Tr1 augmented by the first threshold S1.

In fact, the difference DC between the first and second current temperatures Tc1 and Tc2 is lower than the difference DR between the first reference temperature Tr1 augmented by the first threshold S1 and the second reference temperature Tr2 augmented by the second threshold S2, which means that there is power transmitted to the resistive load 16 then increasing the second current temperature Tc2. In conclusion, there is a variation on the impedance of the antenna 3 and the impedance of the antenna 3 and that seen at the output of the amplifier stage 4 are no longer matched.

In the case where the first current temperature Tc1 is higher than the first reference temperature Tl1, it is also necessary to check the influence of the current ambient temperature on the control method.

In this respect, the third temperature sensor 19 is configured to measure a second current path temperature Tlc2 (STP5C) and then the comparator 21 is also configured to perform a third comparison (STP6C) between the first and second current path temperatures Tlc1 and Tlc2.

When the second current path temperature Tlc2 is lower than or equal to the first current path temperature Tlc1, the first condition is also fulfilled and it can be considered that a matching of the antenna 3 to the transmission path 2 is necessary.

Otherwise, the comparator 21 is also configured to perform a fourth comparison (STP7C) between the difference DC between the first and second current temperatures Tc1 and Tc2 and the difference DR between the first reference temperature Tr1 augmented by the first threshold and the second reference temperature Tr2 augmented by the second threshold.

When the difference DC is lower than or equal to the difference DR, the first condition is fulfilled.

Otherwise, there is no variation detected on the impedance of the antenna 3. The second condition is consequently fulfilled and there is a return to the second step STP2C.

Figure 3:
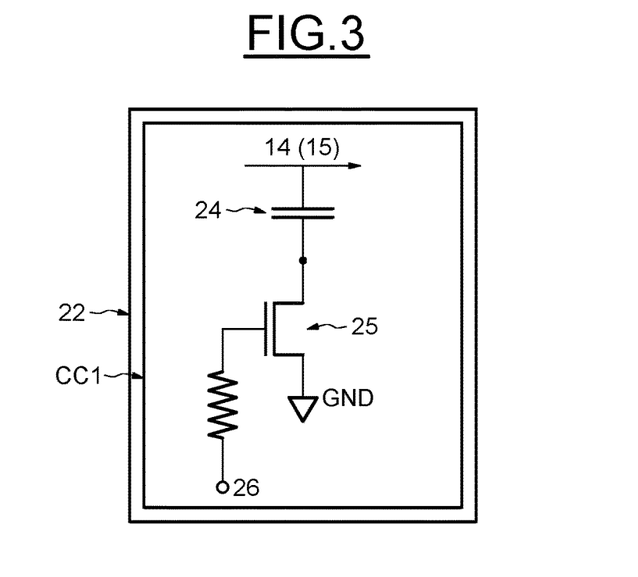
Figure 4:
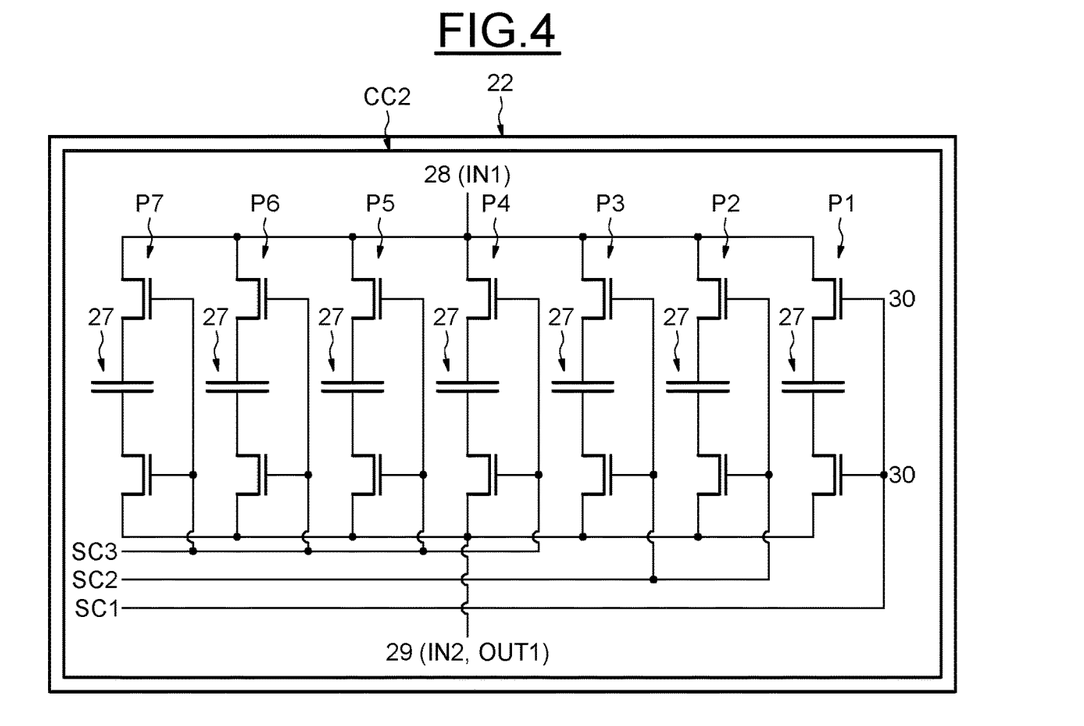

Reference is now made to FIGS. 3 and 4 to illustrate in more detail examples of the controller 22.

In order to modify the impedance seen at the output of the amplifier stage 4, the controller 22 can be coupled to the outputs 14 and 15 of the first and second amplifiers 5 and 6.

As a variant, the controller 22 can also be coupled to the first and second inputs IN1 and IN2 of the power combiner 13 or even to its first and second outputs OUT1 and OUT2.

FIG. 3 illustrates an example of a control circuit CC1 incorporated in the controller 22. A capacitor 24 is coupled between any one of the outputs 14 and 15 of the first and second amplifiers 5 and 6 and the drain of a control transistor 25. The gate of the control transistor 25 is controlled by a control voltage 26 and the source of the control transistor 25 is coupled to the ground GND.

Consequently, the operation of the capacitor 24 and of the control transistor 25 are controlled by the control voltage 26 which is delivered by the comparator 21. When the control voltage 26 is in the high state (this corresponds to the first condition being satisfied), the control transistor 25 is conducting and the capacitor 24 is coupled to the ground GND so as to make a change to the impedance seen at the output of the amplifier stage 4.

When the control voltage is in the low state (which corresponds to the second condition being satisfied), the transistor is blocked and the capacitor makes no change to the impedance seen at the output of the amplifier stage 4.

It should be noted that it is preferable to provide an identical capacitor for each amplifier so as to keep the symmetry of the first and second balanced power amplifiers.

FIG. 4 illustrates an example of another control circuit CC2 intended to be incorporated in the controller 22.

The circuit CC2 comprises a series of capacitors 27 of non-variable capacitance coupled between a first terminal 28 and a second terminal 29 via, respectively, a pair of control transistors 30.

The terminals 28 and 29 of this control circuit CC2 can be coupled for instance to the first and second input terminals IN1 and IN2 of the power splitter 13 or to the first input IN1 and output OUT1 terminals of the power splitter 13.

A first control signal SC1 is coupled to the gates of a first pair P1 of control transistors 30 so as to modify the impedance between the first and second terminals 28 and 29 by rendering the corresponding capacitor active or inoperative.

A second control signal SC2 is coupled to the gates of second and third pairs P2 and P3 of control transistors 30 so as to modify the impedance between the first and second terminals 28 and 29 by rendering the corresponding capacitors active or inoperative.

Likewise, a third control signal SC3 is coupled to the gates of fourth, fifth, sixth and seventh pairs P4 to P7 of control transistors 30 so as to modify the impedance between the first and second terminals 28 and 29 by controlling the conducting or blocked state of the corresponding capacitors when the first condition is fulfilled.

In this way, it is possible to modify more or less finely the impedance between the first and second terminals 28 and 29 by selectively controlling the three control signals SC1 to SC3.

The invention claimed is:

1. A method for controlling the matching of an antenna to a transmission path, the transmission path comprising an amplifier stage coupled at an input or at an output to the antenna and to a resistive load, the method comprising performing a checking phase comprising:
    measuring a first current temperature at or in proximity of the antenna and a second current temperature at or in proximity of the resistive load;
    triggering a matching of the impedance seen at the input or at the output of the amplifier stage in the presence of a first condition involving the first and second current temperatures; and then
    stopping the matching of the impedance in the presence of a second condition involving the second current temperature.

2. The method as claimed in claim 1, further comprising performing a calibration phase prior to the checking phase, the calibration phase comprising:
    replacing the antenna by a reference impedance and setting the amplifier stage in an operating state;
    defining path reference temperatures contained within a range of path reference temperatures; and
    for each path reference temperature, measuring a first reference temperature at the reference impedance and measuring a second reference temperature at the resistive load.

3. The method as claimed in claim 2, wherein the checking phase comprises:
  measuring a current path temperature of the transmission path;
  comparing the second current temperature and the second reference temperature associated with a path reference temperature corresponding to the current path temperature; and
  comparing the first temperature and the first reference temperature associated with a path reference temperature corresponding to the current path temperature;
  wherein the first condition is fulfilled
    when the first current temperature is lower than or equal to the first reference temperature augmented by a first threshold; and
    when the second current temperature is higher than the second reference temperature augmented by a second threshold.

4. The method as claimed in claim 3, wherein the second condition is fulfilled when the second current temperature is lower than or equal to the second reference temperature augmented by the second threshold.

5. The method as claimed in claim 3, wherein the first and second thresholds are equal.

6. The method as claimed in claim 2, wherein the checking phase comprises:
  measuring a first measurement of a first current path temperature of the transmission path;
  comparing the second current temperature and the second reference temperature associated with a path reference temperature corresponding to the first current path temperature;
  comparing the first current temperature and the first reference temperature associated with a path reference temperature corresponding to the first current path temperature;
  after comparing the first current temperature and the first reference temperature, measuring a second current path temperature of the transmission path; and
  comparing the first and second current path temperatures;
  wherein the first condition is fulfilled
    when the first current temperature is higher than the first reference temperature augmented by a first threshold; and
    when the second current temperature is higher than the second reference temperature augmented by a second threshold; and
    when the second current path temperature is lower than or equal to the first current path temperature.

7. The method as claimed in claim 2, wherein the checking phase comprises:
  measuring a first current path temperature of the transmission path;
  comparing the second current temperature and the second reference temperature associated with a path reference temperature corresponding to the first current path temperature;
  comparing the first current temperature and the first reference temperature associated with a path reference temperature corresponding to the first current path temperature;
  after comparing the first current temperature and the first reference temperature, measuring a second current path temperature of the transmission path;
  comparing the first and second current path temperatures; and
  after comparing the first and second current path temperatures, comparing a current difference between the first and second current temperatures and a reference difference between the first reference temperature augmented by a first threshold and the second reference temperature augmented by a second threshold;
  wherein the first condition is fulfilled
    when the first current temperature is higher than the first reference temperature augmented by a first threshold; and
    when the second current temperature is higher than the second reference temperature augmented by a second threshold; and
    when the second current path temperature is higher than the first current path temperature; and
    when the current difference is lower than or equal to the reference difference.

8. The method as claimed in claim 7, wherein the second condition is fulfilled
  when the first current temperature is higher than the first reference temperature augmented by the first threshold; and
  when the second current temperature is higher than the second reference temperature augmented by the second threshold; and
  when the second current path temperature is higher than the first current path temperature; and
  when the current difference is higher than the reference difference.

9. An electronic device comprising a transmission path, the transmission path comprising:
  an amplifier stage configured to be coupled at an input or at an output to an antenna and to a resistive load;
  a first temperature sensor positioned in proximity to the antenna and configured to measure a first current temperature;
  a second temperature sensor positioned in proximity to the resistive load and configured to measure a second current temperature; and
  a processor configured to trigger a matching of the impedance seen at an input or at an output of the amplifier stage in the presence of a first condition involving the first and second current temperatures then to stop the matching of the impedance in the presence of a second condition involving the second current temperature.

10. The device as claimed in claim 9, further comprising a memory configured to store path reference temperatures contained within a range of path reference temperatures and, for each path reference temperature, a first reference temperature measured at a reference impedance in place of the antenna and a second reference temperature measured at the resistive load, with an amplifier stage in operating state.

11. The device as claimed in claim 10, further comprising a third temperature sensor configured to perform a first measurement of a first current path temperature of the transmission path;
  wherein the processor comprises a comparator configured to perform a first comparison between the second current temperature and the second reference temperature associated with a path reference temperature corresponding to the first current path temperature, and a second comparison between the first current temperature and the first reference temperature associated with the path reference temperature; and
  the first condition is fulfilled when the first current temperature is lower than or equal to the first reference temperature augmented by a first threshold; and when the second current temperature is higher than the second reference temperature augmented by a second threshold.

12. The device as claimed in claim 11, wherein the second condition is fulfilled when the second current temperature is lower than or equal to the second reference temperature augmented by the second threshold.

13. The device as claimed in claim 11, wherein the first and second thresholds are identical.

14. The device as claimed in claim 10, further comprising a third temperature sensor configured to perform a first measurement of a first current path temperature of the transmission path;

wherein the processor comprises a comparator configured to perform a first comparison between the second current temperature and the second reference temperature associated with a path reference temperature corresponding to the first current path temperature, and a second comparison between the first current temperature and the first reference temperature associated with the path reference temperature;

wherein the third sensor is also configured to perform, on completion of the second comparison, a second measurement of a second current path temperature of the transmission path;

wherein the comparator is also configured to perform a third comparison between the first and second current path temperatures; and wherein the first condition is fulfilled when the first current temperature is higher than the first reference temperature augmented by a first threshold; and when the second current temperature is higher than the second reference temperature augmented by a second threshold; and when the second current path temperature is lower than or equal to the first current path temperature.

15. The device as claimed in claim 10, further comprising:

a third temperature sensor configured to perform a first measurement of a first current path temperature of the transmission path;

wherein the processor comprises a comparator configured to perform a first comparison between the second current temperature and the second reference temperature associated with a path reference temperature corresponding to the first current path temperature, and a second comparison between the first current temperature and the first reference temperature associated with the path reference temperature;

wherein the third sensor is also configured to perform, on completion of the second comparison, a second measurement of a second current path temperature of the transmission path;

wherein the comparator being also configured to perform a third comparison between the first and second current path temperatures, and, on completion of the third comparison, a fourth comparison between a current difference between the first and second current temperatures and a reference difference between the first reference temperature augmented by a first threshold and the second reference temperature augmented by a second threshold; and wherein the first condition is fulfilled when the first current temperature is higher than the first reference temperature augmented by the first threshold; and when the second current temperature is higher than the second reference temperature augmented by the second threshold; and when the second current path temperature is higher than the first current path temperature; and when the current difference is lower than or equal to the reference difference.

16. The device as claimed in claim 15, wherein the second condition is fulfilled when the second current temperature is higher than the second reference temperature augmented by the second threshold; and when the first current temperature is higher than the first reference temperature augmented by the first threshold; and when the second current path temperature is higher than the first current path temperature; and when the current difference is higher than the reference difference.

17. The device as claimed in claim 9, wherein the transmission path further comprises a first coupling stage comprising a 90° power splitter and a second coupling stage comprising a 90° power combiner of which input or output terminals are to be respectively coupled to the antenna and to the resistive load, the amplifier stage comprising two balanced power amplifiers coupled in parallel between the first and second coupling stages.

18. The device as claimed in claim 17, further comprising a third temperature sensor configured to perform a first measurement of a first current path temperature of the transmission path;

wherein the processor comprises a comparator configured to perform a first comparison between the second current temperature and a second reference temperature associated with a path reference temperature corresponding to the first current path temperature, and a second comparison between the first current temperature and a first reference temperature associated with the path reference temperature; and the first condition is fulfilled when the first current temperature is lower than or equal to the first reference temperature augmented by a first threshold; and when the second current temperature is higher than the second reference temperature augmented by a second threshold.

19. The device as claimed in claim 18, wherein the processor further comprises a controller coupled between the output of the comparator and the inputs or the outputs of the amplifier stage and the inputs and the outputs of the second coupling stage and configured to check the impedance seen at the input or at the output of the amplifier stage as a function of the result of the first and second comparisons.

20. The device as claimed in claim 17, wherein a distance between the input or output terminals of the second coupling stage is greater than 100 μm.

21. An electronic device comprising:

an antenna;

an amplifier stage coupled at an input or at an output to the antenna and to a resistive load;

a first temperature sensor positioned in proximity to the antenna and configured to measure a first current temperature;

a second temperature sensor positioned in proximity to the resistive load and configured to measure a second current temperature; and a processor configured to trigger a matching of the impedance seen at an input or at an output of the amplifier stage in the presence of a first condition involving the first and second current temperatures then to stop the matching of the impedance in the presence of a second condition involving the second current temperature.

22. The device as claimed in claim 21, wherein the device is incorporated in a wireless communication unit.

* * * * *